US005802565A

United States Patent [19]

McBride et al.

[11] Patent Number: 5,802,565
[45] Date of Patent: Sep. 1, 1998

[54] SPEED OPTIMAL BIT ORDERING IN A CACHE MEMORY

[75] Inventors: John G. McBride, Fort Collins; Ted B. Ziemkowski, Loveland, both of Colo.

[73] Assignee: Hewlett-Packard Company, Palo Alto, Calif.

[21] Appl. No.: 705,443

[22] Filed: Aug. 29, 1996

[51] Int. Cl.[6] .................................................. G06F 13/00
[52] U.S. Cl. .................................................. 711/125; 711/5
[58] Field of Search .................................. 711/125, 5

[56] References Cited

U.S. PATENT DOCUMENTS

| 4,491,915 | 1/1985 | Forquer et al. | 364/228.1 |
|---|---|---|---|
| 5,253,203 | 10/1993 | Partovi et al. | 365/189.02 |
| 5,337,415 | 8/1994 | DeLano et al. | 395/389 |
| 5,400,274 | 3/1995 | Jones et al. | 365/63 |
| 5,493,506 | 2/1996 | Sakashita et al. | 364/489 |
| 5,517,440 | 5/1996 | Widigen et al. | 364/786.03 |

Primary Examiner—Tod R. Swann
Assistant Examiner—Felix B. Lee

[57] ABSTRACT

Disclosed herein are methods and apparatus relating to speed optimal bit ordering in a cache memory. All of the data arrays capable of driving a single output bit are grouped with combinational I/O logic for driving same. The data arrays and combinational I/O logic corresponding to a single output bit can be thought of as a bit slice of a cache. Bit slices are preferably arranged so that predecode bit slices are nearest to the I/O end of the cache. A number of predecode bit slices corresponding to a single instruction or data word are preferably followed by the instruction's predecode data bit slices. Non-predecode data bit slices are arranged so that big/little endien data bit pairs are adjacent to one another, or as close to each other as possible given other bit slice ordering restraints. The arrangement of bit slices in big/little endien pairs yields I/O buses of minimum length. Components of combinational I/O logic are arranged in staggered form, perpendicularly to the I/O datapath of a cache. In this manner, a single control line can latch all of the elements in a logical register.

20 Claims, 8 Drawing Sheets

SPEED OPTIMAL BIT ORDERING IN A CACHE MEMORY

BACKGROUND OF THE INVENTION

The invention pertains to methods and apparatus which provide a computer system with speedy access to data stored in a cache memory. More particularly, the invention pertains to a way of ordering the storage and retrieval of data bits so that data bits are provided to the cache memory's output on a first needed, first out basis, thereby decreasing the cache's access time and allowing useful work to be done prior to outputting an entire word of data. Data bits which have less of an output priority are stored in the cache so as to minimize the length of I/O (input/output) bus lines extending into the cache.

Most modern computer systems include a central processing unit 102 (CPU) and a main memory 106. See FIG. 1. The speed at which the CPU 102 can decode and execute instructions and operands depends upon the rate at which the instructions and operands can be transferred from the main memory 106 to the CPU 102. In an attempt to reduce the time required for the CPU 102 to obtain instructions and operands from memory, many computer systems include a cache memory 104 between the CPU 102 and main memory 106.

A cache memory is a small, high-speed buffer memory which is used to hold temporarily those portions of the contents of main memory which it is believed will be used in the near future by the CPU. The main purpose of a cache is to shorten the time necessary to perform memory accesses, either for operand or instruction fetch. Information located in cache memory may be accessed in much less time than information located in main memory. Thus, a CPU with a cache memory needs to spend far less time waiting for instructions and operands to be fetched and/or stored.

A cache memory is made up of a plurality of data arrays. Each data array comprises a string of RAM (random access memory) cells, and each RAM cell stores a single bit of data. A number of RAM cells which are similarly situated in a plurality of data arrays may be used to store a line of data. The line of data may comprise all of the bits of a single instruction or operand (i.e., a word of data), or all of the bits of a plurality of instructions or operands (e.g., a doubleword of data). The line of data may also comprise predecode bits which are associated with an instruction or operand. Predecode bits are used to determine which of a number of buses (external to a cache) an instruction or operand can be carried on. For example, four predecode bits could be used to determine whether an instruction will be output to a 1) positive integer bus, 2) a negative integer bus, 3) either the positive or negative integer bus, or 4) a floating-point bus.

Each line of data has associated with it an address tag and cache index which uniquely identify which block of main memory it is a copy of. Each time a CPU makes a memory reference, an address tag comparison is made to see if a copy of the requested data resides in cache memory. If the desired line of data is not in the cache, the line is retrieved from main memory, stored in the cache, and supplied to the CPU.

Typically, an address tag and cache index will reference a block of memory addresses in main memory. The block of memory addresses may comprise a collection of precise memory locations. So as not to have to reference every memory address of main memory (some of which may be infrequently used by a CPU), an address tag will reference a block of main memory addresses, and each address tag will in turn be associated with a plurality of RAM cell lines in a cache. When address tag comparisons are made within a cache, and it is determined that there is an address tag match, each of the plurality of RAM cell lines associated with the particular address tag is activated. Combinational I/O logic is then used to determine which of the lines of data referenced by the address tag, if any, has been requested by a CPU. The number of data lines from which combinational I/O logic has to select is typically in the range of one to four.

In addition to using a cache to temporarily store data retrieved from main memory, a CPU may write data directly into a cache rather than main memory. When the CPU desires to write data to the cache memory, the cache makes an address tag comparison to see if one or more lines of RAM cells in the cache are already addressed to the block of main memory which the CPU's data is a copy of. If not, one or more lines of RAM cells in the cache must be addressed to an appropriate block of main memory, or alternatively, the data must be written directly to main memory.

A cache is a form of random access memory. Although access is random, a cache's organization should not be. However, little thought is usually given to the physical arrangement of data arrays and combinational I/O logic comprising a cache. As a result, the components of a cache are sometimes arranged in a somewhat random manner. This random arrangement can interfere with the efficient operation of a cache, resulting in loss of speed and the like. For example, data arrays situated further away from a cache's output require more time to transmit their data to the cache's output. If data bits comprising a word of data can be used prior to outputting the entire word of data to which they belong (such is the case with predecode bits), the data arrays which store these data bits should be placed in physical proximity to a cache's output. Often, they are not.

However, even an organized arrangement of the components comprising a cache can be detrimental to the cache's efficiency in storing and outputting data. For example, in a cache that selects a single doubleword output from among four stored doublewords sharing a common address tag, data arrays might be arranged so that the bits of each doubleword are stored in a contiguous block of cache memory. However, the multiplexing of data bits in such an arrangement requires extensive and lengthy wire routings. As is well known in the art, lengthy wire routings have an extremely adverse impact on high-speed, timing critical circuitry such as a cache.

A need for a cache with an improved physical layout therefore exists. Towards this goal, the following objectives relating to speed optimal bit ordering in a cache are herein addressed.

In an effort to reduce the lengths of wire routings in a cache, an important object of this invention is to provide a cache which minimizes the lengths of its primary I/O bus lines.

A further object of this invention is to provide a cache with components arranged so as to allow data bits to be output in a prioritized order, thereby allowing the commencement of work on or with the data bits before an entire word or words of data are output from the cache.

Yet another object of this invention is to provide a cache wherein the placement of combinational I/O logic and associated data arrays is dictated by the layout of the cache's primary I/O bus.

An additional object of this invention is to provide a cache wherein the placement of combinational I/O logic minimizes capacitive effects on the cache's control lines.

It is also an object of this invention to provide methods for constructing and optimizing the above-mentioned apparatus.

SUMMARY OF THE INVENTION

In the achievement of the foregoing objects, the inventors have devised a speed optimal bit ordering for a cache memory. Although the following description frequently references an instruction cache, the methods and apparatus disclosed are equally applicable to data caches, and use of the term "instruction cache" is understood to include any cache memory storing microprocessor instructions and/or operands.

A first improvement over previous cache structures is in the storage of data affecting a single output bit. Since all data arrays in a cache memory are physically identical, data to be supplied to a single output bit may be logically stored in any of the data arrays. To reduce the length of wire routings, and increase the speed at which data is supplied to combinational I/O logic (e.g., multiplexers and latches), all of the data having an impact on a single output bit is stored either in a contiguous block of cache memory, or in a proximally close relationship. Thus, in a cache selecting a doubleword output from among four stored doublewords, the data bits of each doubleword affecting "bit 7, word 1" are stored in close proximity to one another. Combinational I/O logic associated with "bit 7, word 1" can therefore be placed physically close to all of its input data. In this manner, a cache may be arranged in a plurality of bit slices (or bit half-slices, as will be more fully described). Each bit slice (or bit half-life) comprises all of the data arrays and combinational I/O logic corresponding to a single output bit.

A second cache improvement pertains to a cache having left and right banks of data arrays with an I/O bus running between the banks. In such a cache, an equal number of data arrays corresponding to a single output bit may be placed in each bank. This allows combinational I/O logic to be placed between the banks and in close relationship to the I/O bus.

A third improvement over previous cache structures is in the ordering of bit slices. Bit slices corresponding to predecode bits are placed in physical proximity to a cache's output (i.e., towards the I/O end of a cache's I/O bus). Predecode data bits (i.e., those bits of an instruction which are used in generating the instruction's predecode bits) are given second priority with regards to physical proximity to the I/O end of a cache's I/O bus. Finally, non-predecode data bits of an instruction or instructions are placed closer to the terminal end of a cache's I/O bus. NOTE: As referred to in this description, the I/O end of an I/O bus is understood to be the end of a bus where an instruction leaves or is received by a cache. The terminal end of an I/O bus may have I/O connections (such as diagnostic connections), but these connections are unrelated to instruction and predecode I/O.

A fourth improvement over previous cache structures relates to the arrangement of combinational I/O logic components. Components are staggered perpendicularly to the flow of data on a cache's I/O bus. In this manner, control lines running parallel to the I/O bus can be connected to components in a plurality of bit slices, yet not pass over components to which they are not connected. This arrangement reduces the affect of parasitic capacitance on logic control lines.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF THE PREFERRED EMBODIMENT

Figure 13:
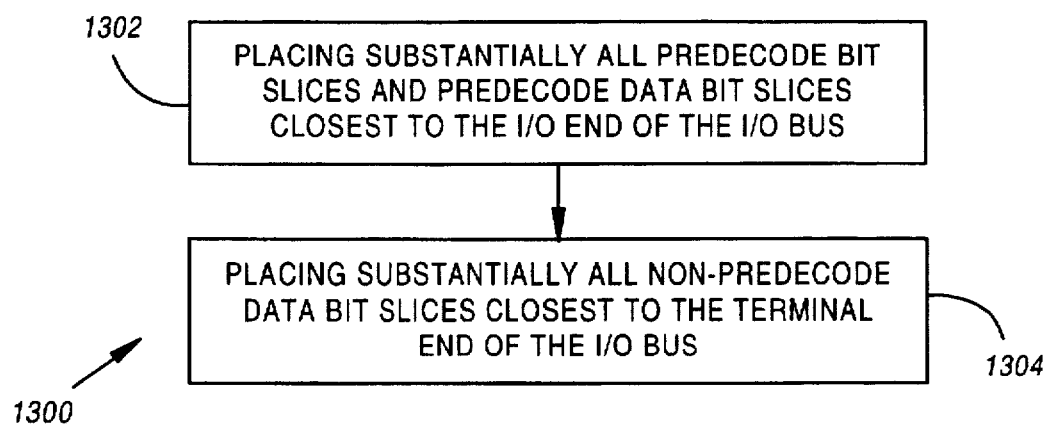
FIG. 13 is a flow chart illustrating a first preferred method for ordering bit slices in an instruction cache.
Figure 14:
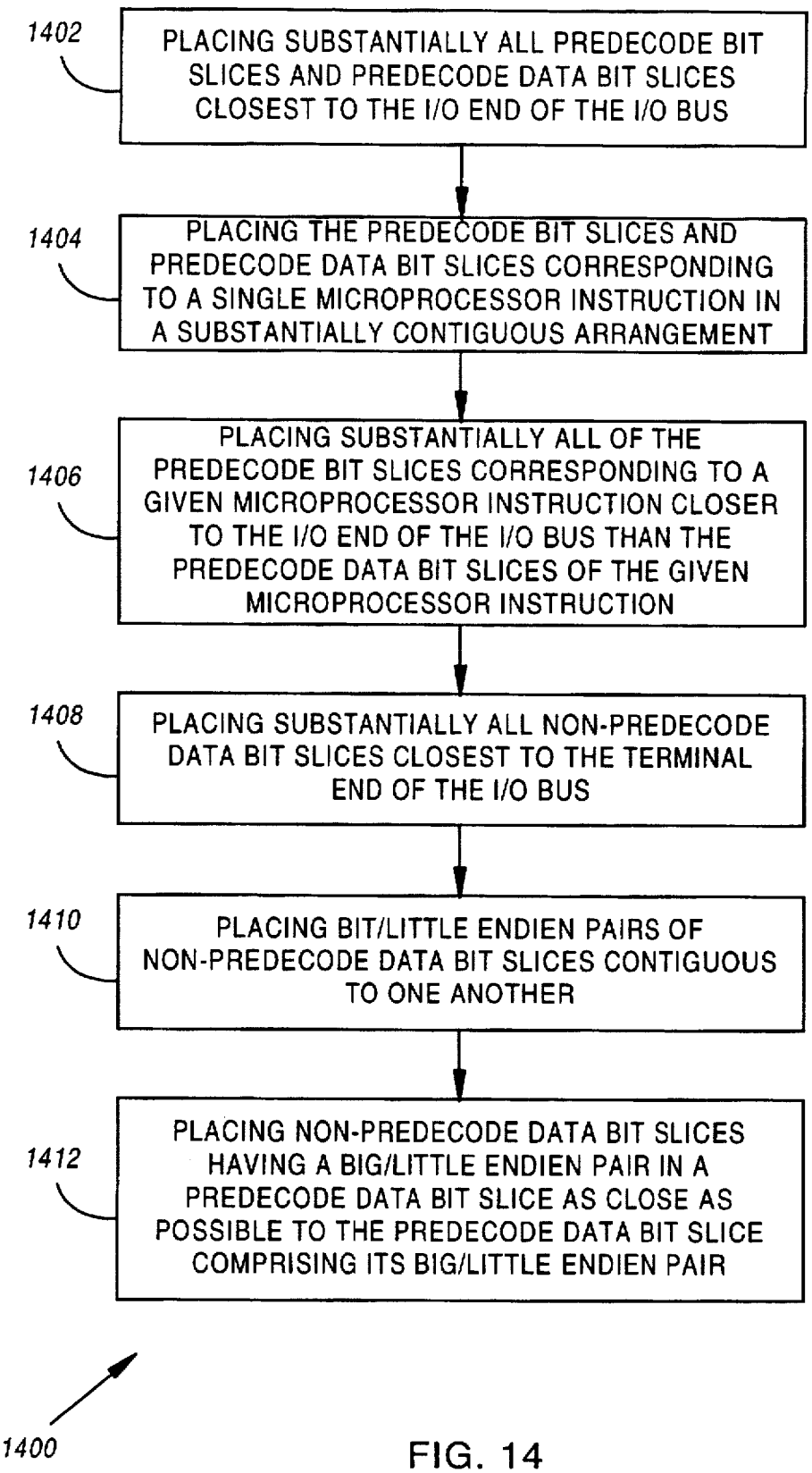
FIG. 14 is a flow chart illustrating a second preferred method for ordering bit slices in an instruction cache.

Methods 1300, 1400 of ordering bit slices 362 (FIG. 3) in a microprocessor instruction cache 200 (FIG. 2) are shown generally in FIGS. 13 & 14. The methods 1300, 1400 may be used in a cache 200 comprising an I/O bus 206, 370, a plurality of data arrays 204, and combinational I/O logic 206, 368, wherein the I/O bus 206, 370 has a terminal end 212 and an I/O end 214, the combinational I/O logic 206, 368 and plurality of data arrays 204 form a plurality of bit slices 362 running substantially perpendicular to the I/O bus 206, 370, and each bit slice 362 corresponds to a single bit 366 to be output from the cache 200. See FIGS. 2 & 3. The methods 1300, 1400 may generally comprise the steps of 1) placing 1302, 1402 substantially all predecode bit slices and predecode data bit slices corresponding to a plurality of microprocessor instructions closest to the I/O end 214 of the I/O bus 206, 370, and 2) placing 1304, 1408 substantially all non-predecode data bit slices closest to the terminal end 212 of the I/O bus 206, 370.

In conformance with the above methods 1300, 1400, a microprocessor instruction cache 200 (FIG. 2) for storing and outputting a plurality of microprocessor instructions, along with their corresponding predecode bits, may generally comprise an address decoding unit 202, a plurality of data arrays 204 coupled to the address decoding unit 202, an I/O bus 206, 370 (FIGS. 2 & 3) having terminal 212 and I/O 214 ends, and combinational I/O logic 206, 368 connecting each of the plurality of data arrays 204 to the I/O bus 206, 370. The combinational I/O logic 206, 368 and plurality of data arrays 204 can be arranged to form a plurality of bit slices 362 running substantially perpendicular to the I/O bus 206, 370. Each bit slice 368 corresponds to a single bit 366 to be output from the cache 200. The bit slices 368 comprise predecode bit slices, predecode data bit slices, and non-predecode data bit slices. The bit slices 368 nearest the I/O end 214 of the I/O bus 206, 370 comprise substantially all of the predecode bit slices and predecode data bit slices.

A variation 500 (FIG. 5) of the above microprocessor instruction cache 200 may comprise an address decoding unit, a plurality of data arrays 502, 504 coupled to the address decoding unit, an I/O bus 506 having terminal 520 and I/O 518 ends, and combinational I/O logic 508, 510 connecting each of the plurality of data arrays 502, 504 to the I/O bus 506. However, the combinational I/O logic 508, 510 and plurality of data arrays 502, 504 can be alternately arranged so as to form a plurality of bit half-slices 514, 516 extending substantially perpendicular to the left and right of the I/O bus 506. As with the previously mentioned bit slices 362 (FIG. 3), each bit half-slice 514, 516 corresponds to a single bit to be output from the cache 500. Also similar to previously mentioned bit slices 362, the bit half-slices 514, 516 comprise predecode bit half-slices, predecode data bit half-slices, and non-predecode data bit half-slices. In conformance with aspects of the above described methods 1300, 1400 (FIGS. 13 & 14), the bit half-slices 514, 516 nearest the I/O end 518 of the I/O bus 506 comprise substantially all of the predecode bit half-slices and predecode data bit half-slices.

Having generally described microprocessor instruction caches with ordered bit slices, and methods for ordering same, the above-described methods and apparatus will now be described with more specificity.

Figure 1:
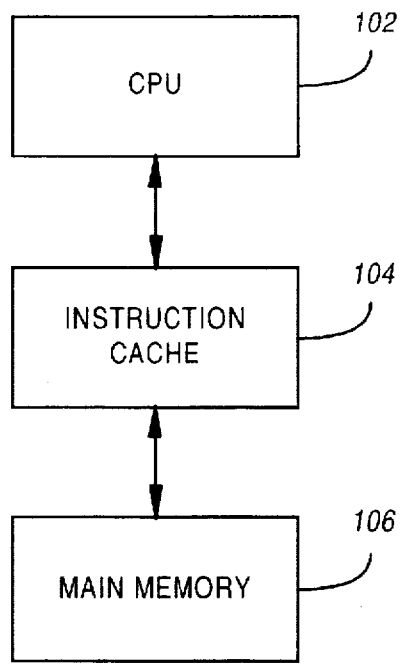
FIG. 1 is a schematic illustrating the placement of an instruction cache between main memory and a CPU.

As earlier mentioned, an instruction cache 104 generally lies between a central processing unit (CPU) 102 and a main memory 106. See FIG. 1. In its most basic form, an instruction cache 104 comprises an address decoding unit 202, a plurality of data arrays 204 coupled to the address decoding unit 202, an I/O (input/output) bus 206, and combinational I/O logic connecting each of the plurality of data arrays 204 to the I/O bus 206. See FIG. 2. The I/O bus 206 may receive data bits 208 comprising an instruction from external memory 106, or may return data bits 210 comprising an instruction to a CPU 102.

The I/O operations of an instruction cache 104 are timing critical. In a worst case scenario, it might be necessary to output a microprocessor instruction only one cycle after it has been input into the cache 104.

Figure 3:
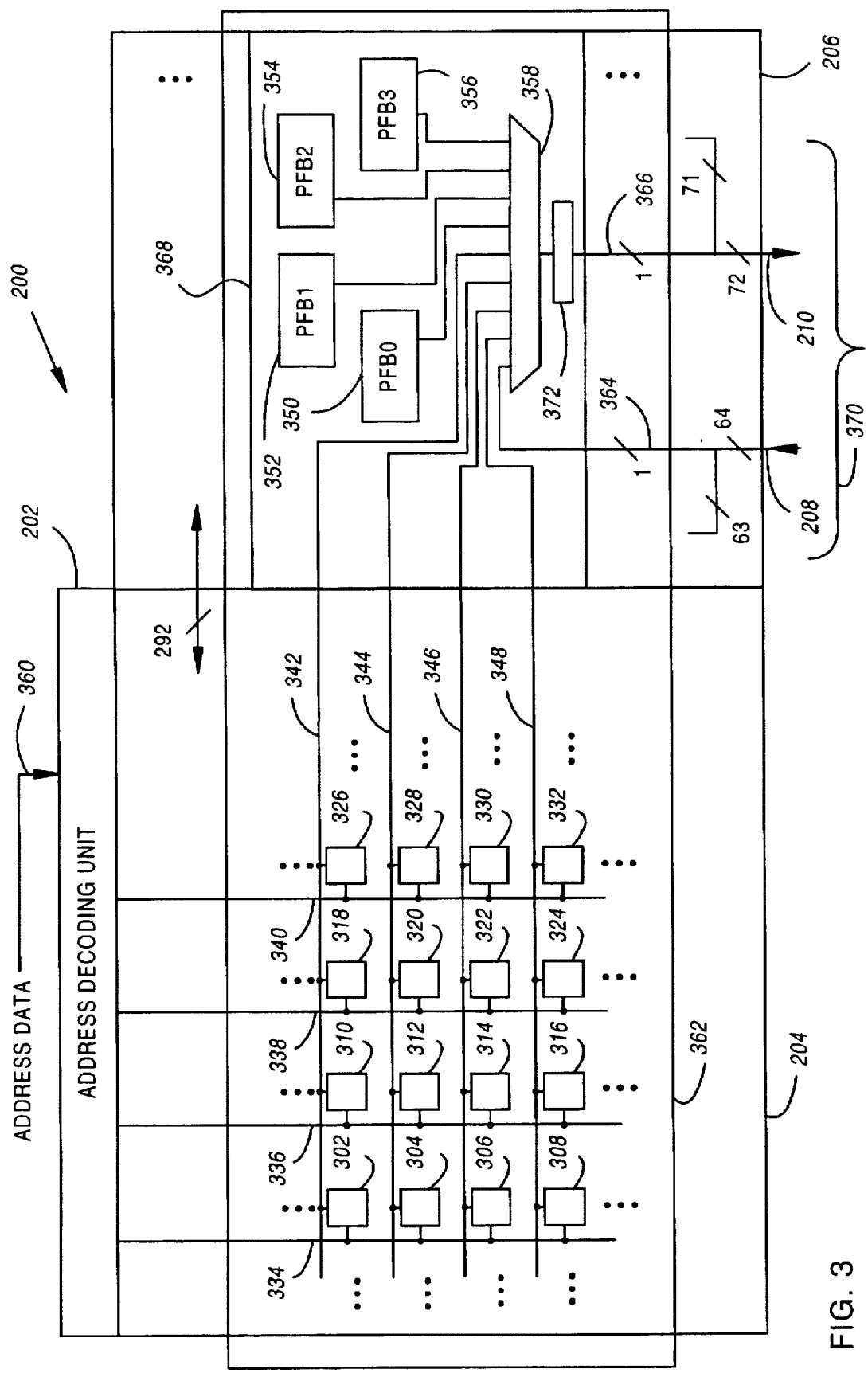
FIG. 3 is a schematic generally illustrating the data arrays and combinational I/O logic associated with a single bit slice of the FIG. 2 instruction cache.

The construction and operation of an instruction cache 200 is presumed to be well understood by one skilled in the art. However, for the purpose of establishing a framework for further description, the basic operation of an instruction cache 200 is illustrated in FIG. 3, and summarily described below. When a CPU 102 wishes to retrieve an instruction from memory, it will cause the instruction's address to be sent to the address decoding unit 202 of an instruction cache 200. The instruction's address may comprise an N-bit word of address data 360 comprising an address tag. The address decoding unit 202 will in turn decode the address data 360, thereby activating a single word line 334–340 driving a plurality of RAM cells (random access memory cells) 302–332. Note that only one of the lines 334–340 shown in FIG. 3 will be activated at any given instant. Each RAM cell 302–332 stores a single bit of data which possibly comprises a bit of the requested instruction's data. When a line 336 of RAM cells 310–316 is activated, each RAM cell 310–316 transmits its single bit of stored data along a bit line 342–348 to which the RAM cell 310–316 is connected. All of the bit lines 342–348 transmitting data corresponding to a specified bit position of the requested instruction are received by a single combinational I/O logic block 368. The logic block 368 may also receive data from one or more prefetch buffers (PFB0 350, PFB1 352, PFB2 354 and PFB3 356 in FIG. 3), and a bypass line 364 derived from the instruction cache's input 208. The combinational I/O logic block 368 selects a single output bit 366 from among its inputs (e.g., via a multiplexing 358 and latching 372 mechanism, as shown in FIG. 3).

The data arrays 302–332 and combinational I/O logic 368 corresponding to a single bit position 366 of an instruction cache's output 210 will be referred to herein as a bit slice 362. The various instruction cache's 200, 400, 500 shown in FIGS. 2–5 each comprise seventy-two bit slices corresponding to the bits of two 32-bit instructions and eight predecode bits. Each of the 32-bit instructions is associated with four predecode bits. Thus, the datapath of the caches in FIGS. 2–5 are seventy-two bits wide (i.e., 32+4+32+4=72). The two 32-bit instructions may at times be referred to as a doubleword. The datapath may further comprise lines for carrying a hit signal, parity signals, control signals, and/or other miscellaneous signals. However, these signals are not relevant to an understanding of bit slice ordering as presented in this description.

Figure 2:
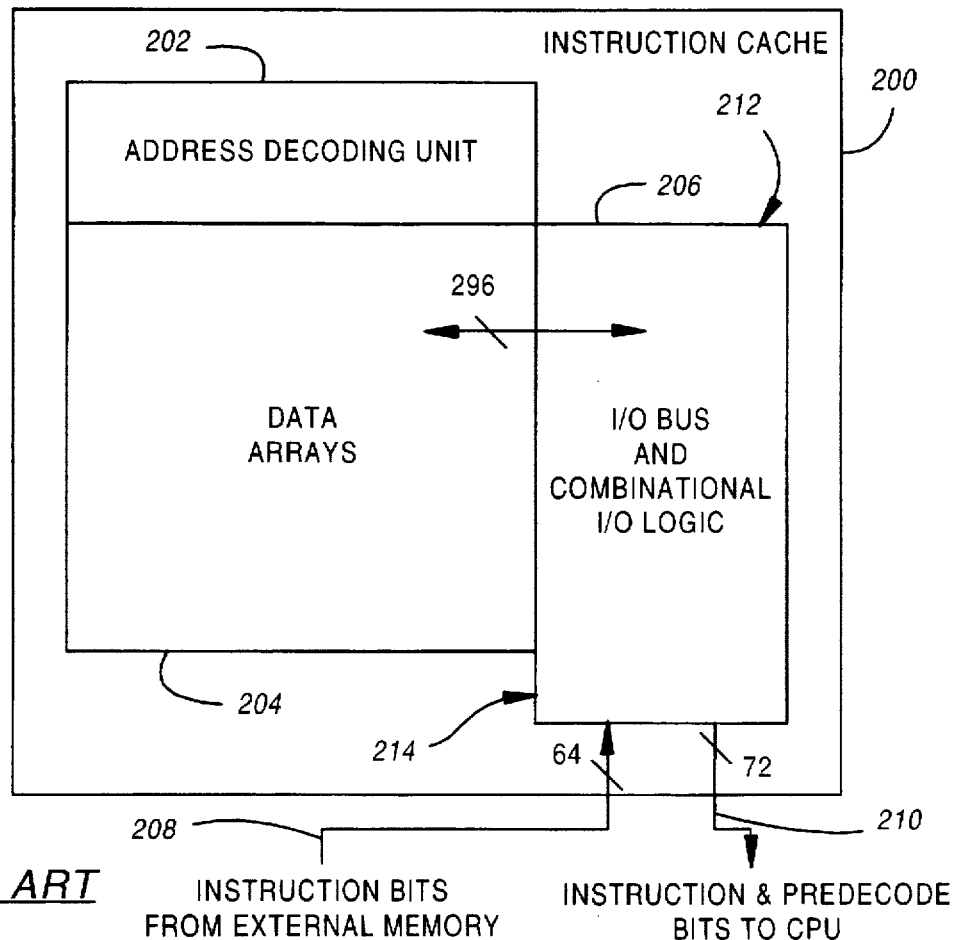
FIG. 2 is a schematic illustrating the components and logical I/O of an instruction cache.
Figure 4:
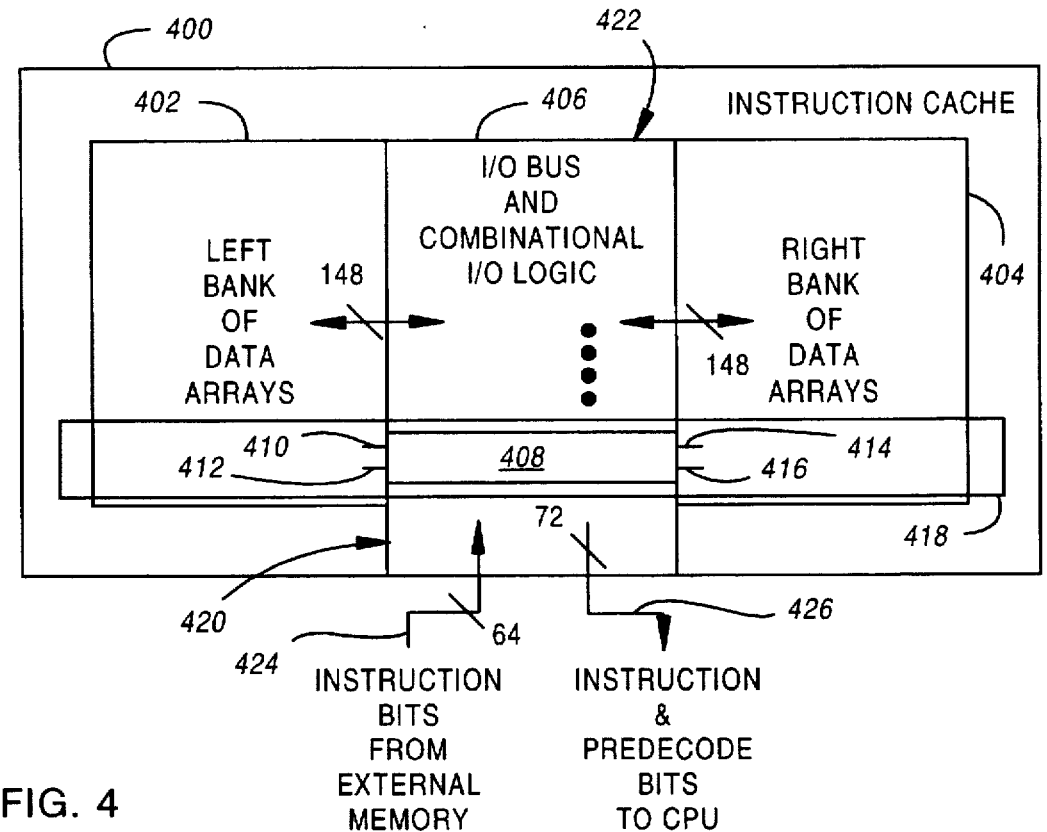
FIG. 4 is a schematic illustrating a double bit slice with connections to left and right banks of data arrays in an instruction cache.
Figure 5:
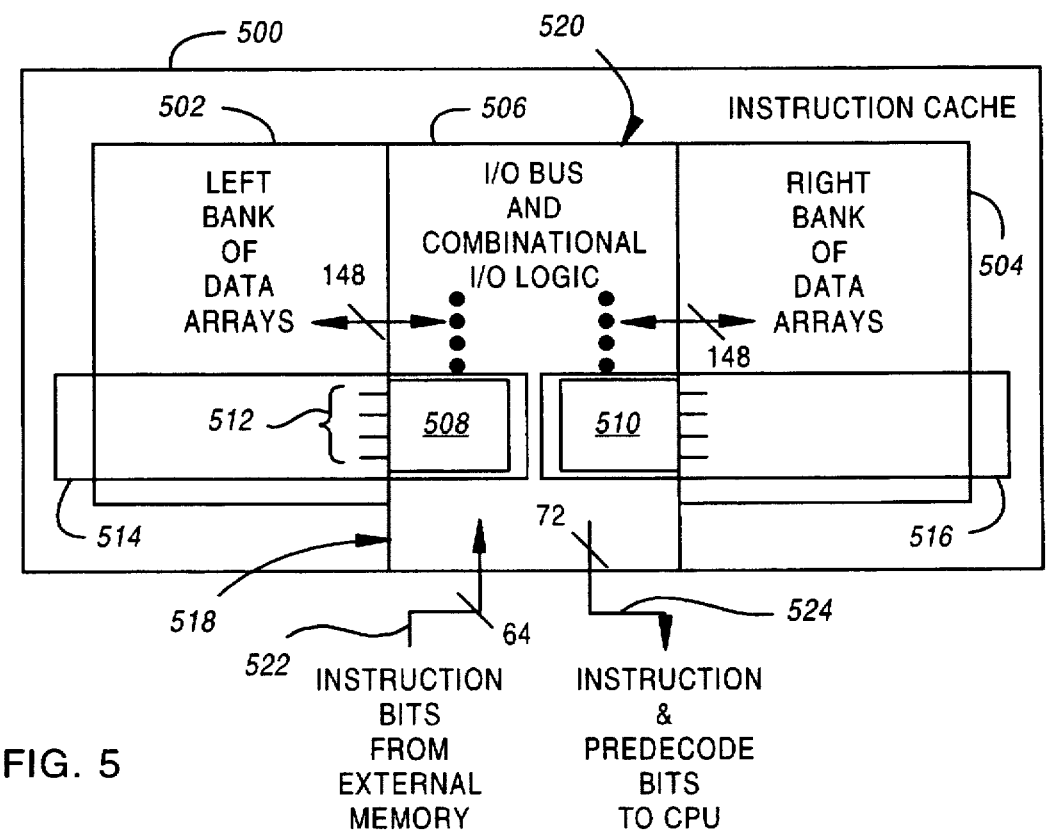
FIG. 5 is a schematic illustrating bit half-slices with connections to either the left or right bank of data arrays in an instruction cache.

Note that in FIGS. 2–4, each bit slice 362, 418 extends the horizontal width of the cache 200, 400. In FIG. 5, however, where the cache 500 comprises left 502 and right 504 banks of data arrays, each bit slice 508, 510 extends only half the horizontal width of the cache 500. These bit slices will be referred to as bit half-slices 514, 516, but in many respects, they may be arranged similarly to other bit slices 362, 418.

The seventy-two output bits are generated by seventy-two combinational I/O logic blocks (206 & 368 in FIG. 3, 406 & 408 in FIG. 4, and 506, 508 & 510 in FIG. 5). Each of the logic blocks 368 (FIG. 3) is shown to select 358 an output bit 366 from among four data arrays, where each data array comprises a number of RAM cells 302, 310, 318, 326 connected to a single bit line 342. Thus, the doubleword cache output 210 is selected from among four doublewords stored in the cache. Selection is based on indexing addresses into the arrays 204, and the results of address tag comparisons, as is more fully described in the U.S. patent application of McBride et al. (sharing common inventorship with this application) filed Aug. 7, 1996 (Serial Number unknown) and entitled "Speed Efficient Cache Output Selection Based on Tag Compare and Data Organization". This creates a total of 288 I/O paths between the plurality of data arrays 204 and the combinational I/O logic blocks 368 (296 I/O paths if including a preferred number of parity lines). Although each bit slice 362 in the illustrated caches 200, 400, 500 is shown to select an output 366 from among four data arrays, the number of data arrays (or bit lines 342–348) from which an output is selected is not crucial to the physical arrangement of bit slices 368 and may vary from cache to cache.

The basic components 202, 204, 206 of a cache 200 may be arranged on an integrated circuit (IC) in numerous ways. However, the manner in which components 202, 204, 206 are arranged in relation to one another has a significant impact on the performance of the cache 200. Since accesses to and from a cache 200 are timing critical (i.e., excess time allotted to accessing a cache has a direct and adverse impact on the speed at which a CPU can function), a cache must be designed for maximum efficiency.

FIGS. 2 and 3 show one arrangement for the components 202, 204, 206 of the cache 200. However, the arrangements 400, 500 shown in FIGS. 4 and 5 are currently preferred. The cache embodiments 400, 500 of FIGS. 4 and 5 are essentially rectangular (long side down). Their I/O buses 406, 506 are constructed so as to extend vertically through their horizontal midpoints. The data arrays 402, 404, 502, 504 of each cache are arranged so as to extend horizontally to the left and to the right of their cache's I/O bus 406, 506, thereby forming left 402, 502 and right banks of data arrays 404, 504. In this arrangement, the lengths of bit lines routed between a cache's I/O bus 406, 506 and RAM cells are minimized. Combinational I/O logic 408, 508, 510 is arranged so that all data I/O to and from the arrays 402, 404, 502, 504 takes place along or within the vertical boundaries of the cache's I/O bus 406, 506.

Address decoding units are not shown in FIGS. 4 and 5 as they are not necessary for a teaching of bit ordered caches. Address decoding units for these caches might be routed above, below, next to, or through any vertical or horizontal slice of the cache's data arrays 402, 404, 502, 504. Also note that bit slices corresponding to parity bits are excluded from the following discussion. Parity bit slices are preferably placed in close proximity to the address decoding units.

The left 402 and right 404 banks of data arrays shown in FIG. 4 (and in FIG. 5) are physically identical. Given the same I/O constraints as were given for the FIG. 2 cache 200, each bank of arrays 402, 404 will have 148 data I/Os (four of which are parity), for a total of 296 I/Os between the two of them. These 296 I/Os provide the 4 doublewords (plus their predecode bits) that the instruction cache 400, 500 must select from for output.

With each data array in the left 402 and right 404 bank being physically identical, any data array can be used to store a particular bit comprising one of the four doublewords to be selected from by combinational I/O logic 408.

A first choice to be made in arranging a cache is how to store the data from which a single output bit is selected. Preferably, the four data bits from which an output is selected should be as close together as possible (1404, FIG. 14). With this constraint in mind, two data arrays 410, 412 are placed in the left bank of data arrays 402, and two data arrays 414, 416 are placed in the right bank of data arrays 404 in the FIG. 4 cache 400. The data arrays 410–416 corresponding to a single bit slice 418 are placed directly opposite one another. This arrangement will be referred to herein as a double bit slice since the physical slice 418 is two data arrays 410, 412 high.

An alternative to the double bit slice 418 arrangement is to place all four data arrays 512 (FIG. 5) corresponding to a single output bit in either the left bank of data arrays 502 or the right bank of data arrays 504. While this is appealing due to the compactness of the combinational I/O logic 508, 510 associated with each output bit, a downside is that half of the cache's inputs 522 would have to drive from the left side of the cache 500 to the right bank of data arrays 504, and half of the cache's outputs would have to drive from the left bank of data arrays 504 to the right side of the cache 500 (assuming an input bus 522 on the left side of the cache 500, and an output bus 524 on the right side of the cache, as shown in FIG. 5). Furthermore, each group of four data arrays 512 would require more vertical routing since the logic control lines for each output bit's combinational I/O logic 508 would have to be duplicated on each side of the cache 500 (as will become apparent after the ordering of bit slices 418, 508, 510 has been explained). In a double bit slice 418 arrangement, each control line takes up only one vertical routing track.

Another alternative to the double bit slice 418 arrangement is to place all of the data arrays corresponding to a single instruction (data word) in physical proximity. While this arrangement is logically appealing, the physical requirements of wiring 288 physically separated bits is prohibitive—both from a manufacturing standpoint, and from a cache optimization standpoint. Power, timing, and/or space complications result from having to route bit lines long distances to be multiplexed or wire-ORed together. The drivers required to bring timing down to an acceptable level would require significantly more power and IC space.

Once a decision has been made to structure a cache 200, 400, 500 in bit slices, and the arrangement of data arrays and combinational I/O logic within a slice has been determined, a second choice to be made in arranging a cache is how to order individual bit slices between an I/O bus' terminal 212, 422, 520 and I/O ends 214, 420, 518. An I/O bus pigtail extending between a cache output 210, 426, 524 and a bit slice placed close to the bus' I/O end 214, 420, 518 is significantly shorter than a pigtail extending between a cache output 210, 426, 524 and a bit slice placed close to the bus' terminal end 212, 422, 520.

Before describing detailed bit slice arrangements, a word is necessary concerning predecode bits. Predecode bits are generated by combinational logic in an instruction cache 200, 400, 500 as an instruction is delivered to the cache 200, 400, 500. Each instruction typically requires four predecode bits, but only eleven data bits of an instruction factor into the generation of these bits. Predecode bits are the most timing critical output of a cache 200, 400, 500. In the case where cache inputs 208, 424, 522 are driven to cache outputs 210, 426, 524 only one phase after the inputs arrive (via a bypass line 364, the predecode bits need to be generated in this time as well. And in any case, a cache output 210, 426, 524 cannot be placed on a bus external to the cache (such as an integer or floating-point bus, not shown) until predecode bits are output from the cache 200, 400, 500 and decoded. As a result, predecode bits are timing critical both in the case where a cache output originates in the arrays 204, 402, 404, 502, 504, and in the case where the output originates with an instruction cache input 208, 424, 522.

Bit slices 418, 508, 510 may be arranged vertically along a cache's I/O bus 406, 506 in a multitude of ways. However, as previously mentioned an I/O bus pigtail between a bit slice 418, 508, 510 and a cache output 426, becomes shorter as a bit slice 418, 508, 510 is placed closer to an I/O bus' I/O end 420, 518. Again, the vertical arrangement of bit slices 418, 508, 510 is completely discretionary due to the fact that each data array in a cache is identical to all other data arrays in the cache (but for its placement within the cache 400, 500).

Figure 6:
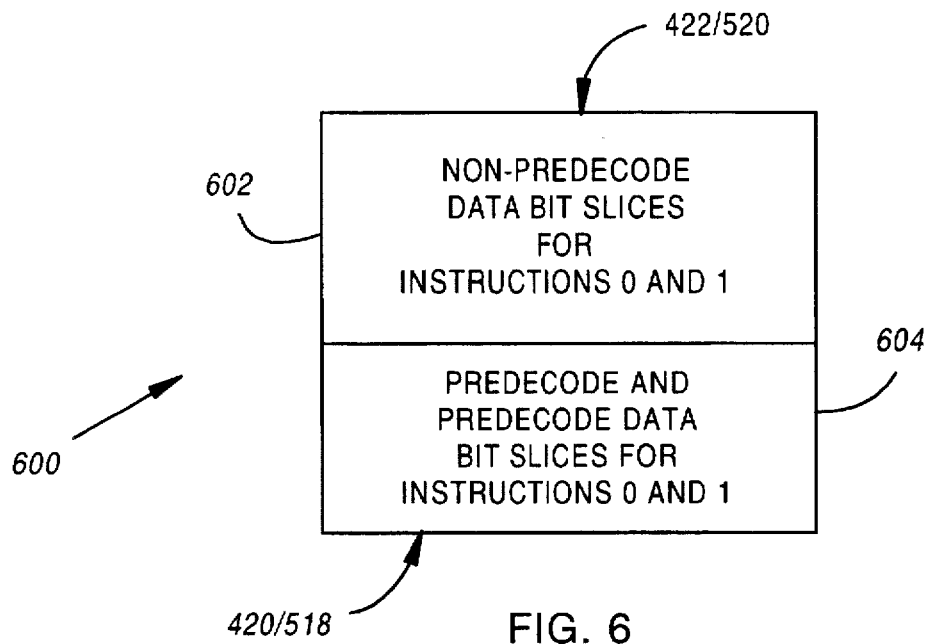
FIG. 6 is a block diagram illustrating a first preferred embodiment of ordered bit slices in an instruction cache.

In a currently preferred cache embodiment 600 (FIG. 6), highest priority is given to the generation of predecode bits since they are the most timing critical outputs of a cache 400, 500. As shown in FIGS. 6 and 13, all of the predecode and predecode data bit slices 604 for a plurality of instructions (i.e., instructions 0 and 1 in FIG. 6) are placed 1302 closest to the I/O end 420, 518 of a cache's I/O bus 406, 506. Non-predecode data bit slices are placed 1304 farther from the I/O end 420, 518 of an I/O bus 406, 506. In this manner, predecode information travels on shorter bus pigtails and arrives at the cache output earlier than other data. Placing predecode and predecode data bit slices at or near the I/O end 420, 518 of an instruction cache has the benefits of 1) requiring less time to store data receive from the cache input 424, 522, 2) requiring less time to drive out data received from the cache input 424, 522, and 3) requiring less time to drive out data retrieved form data arrays 402, 404, 502, 504.

Figure 7:
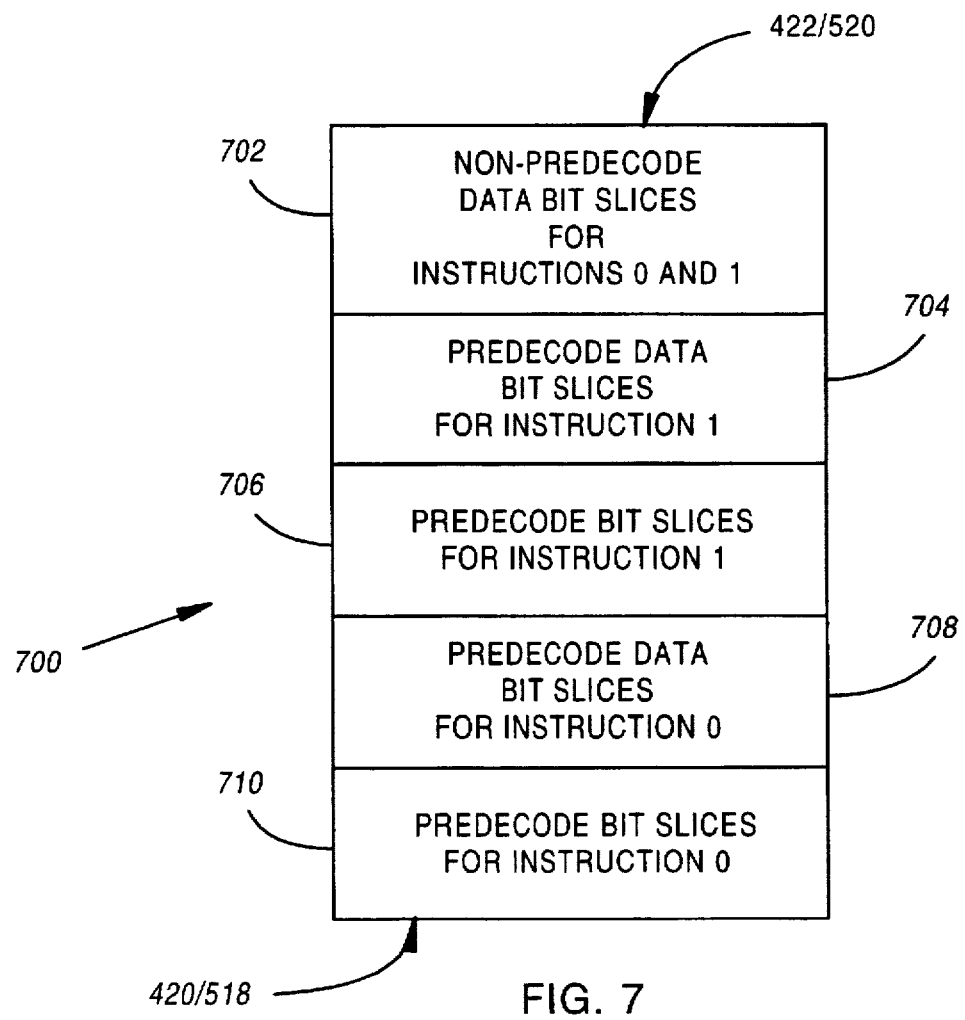
FIG. 7 is a block diagram illustrating a second preferred embodiment of ordered bit slices in an instruction cache.

Within the predecode and predecode data bit slices 604, further ordering 700 is beneficial. As shown in FIGS. 7 and 14, the predecode bit slices 710 of a first instruction (INSTRUCTION 0) to be output from a cache 400, 500 are placed 1402, 1406 nearest an the I/O end 420, 518 of an I/O bus 406, 506. The first instruction's predecode bit slices 710 are followed by bit slices 708 of data used in generating its predecode bits. Following these bit slices 710, 708 are the predecode bit slices 706 of a second instruction (INSTRUCTION 1) to be output from the cache, followed by the second instruction's predecode data bit slices 704. Again, non-predecode data bit slices 702 are placed 1408 nearer to the terminal end 422, 520 of a cache's I/O bus 406, 506.

Note that the selection of which instruction's bit slices 808, 810 are placed closer to the I/O end 420, 518 of the I/O bus 406, 506 is not critical, so long as the general relationship between an instruction's bit slices 804/808, 806/810 is maintained.

Figure 8:
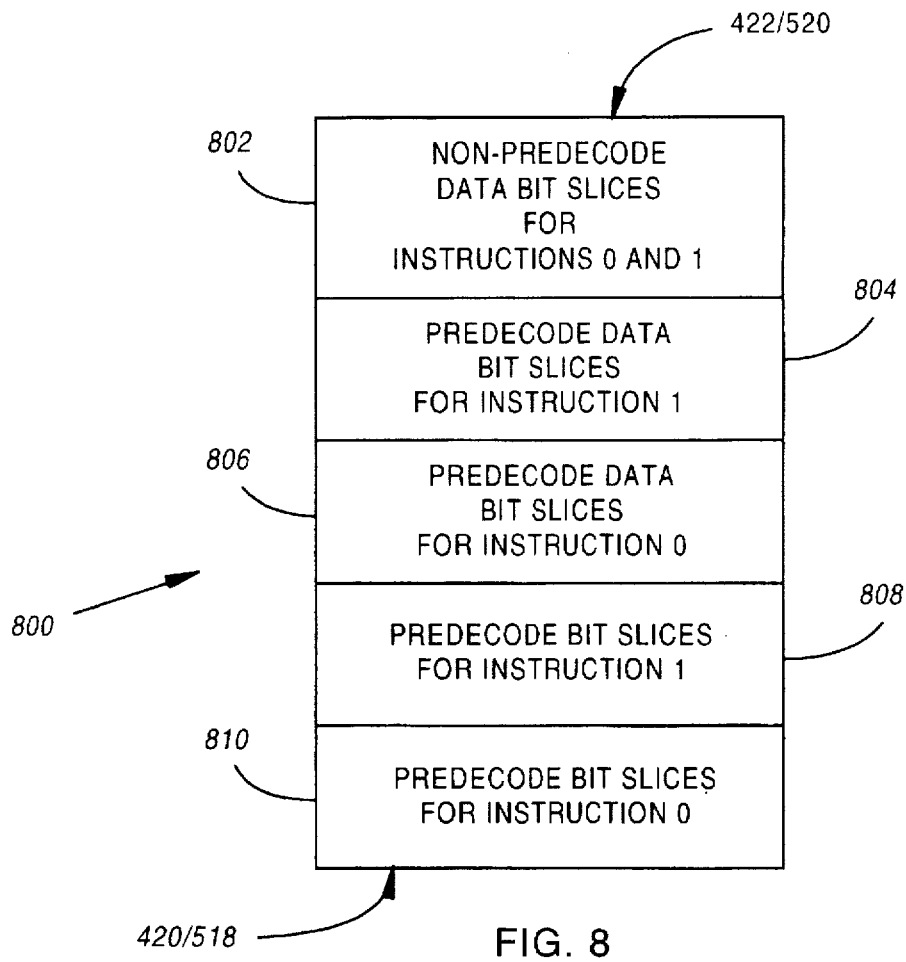
FIG. 8 is a block diagram illustrating a third preferred embodiment of ordered bit slices in an instruction cache.

An alternative arrangement 800 for a cache's predecode and predecode data bit slices 604 would be to have the bit slices nearest the I/O end 420, 518 of a cache 400, 500 be the predecode bit slices 810, 808 for all instructions to be output. See FIG. 8. The predecode bit slices 810, 808 could be followed by the predecode data bit slices 806, 804 for all instructions, followed by all non-predecode data bit slices 804, 802. While this arrangement 800 would provide optimal output timing in the case where data arrays 404, 404, 502, 504 provide a cache's output data 426, 524, the cache's output path would be severely penalized when an output was derived from a newly received instruction 424, 522. This is because the distance between predecode generation logic (contained in the predecode bit slices) and predecode data bit slices would be longer. Also, the output paths for predecode bits are normally driven by drivers which are much larger (and use a much less capacitive and less resistive wire) than would be possible to use in a path connecting predecode logic and the predecode double bit slices (i.e., In this arrangement, larger internal drivers would be required to speed up the output of predecode data bits. However, large internal drivers would be difficult to implement due to their adverse capacitive effects on small RAM cells and the like internal to a cache).

Another alternative for arranging the bit slices would be to group bit slices by instruction words. But as previously pointed out, and while appealing in its logical simplicity, one or more sets of predecode output bits would be severely penalized by having to go more than half way across the vertical distance of a cache 400, 500. A cache's input to output path would have to pay this penalty twice—once on the way in, and once on the way out.

The non-predecode data bit slices 602 can also be further ordered to increase the efficiency and speed of a cache 400, 500.

Figure 9:
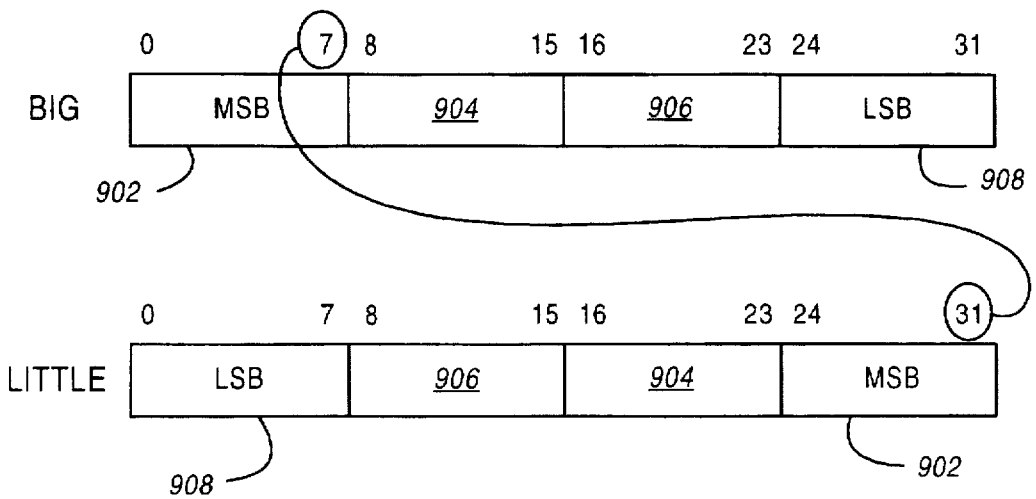
FIG. 9 is a schematic illustrating "big" and "little" endienness in a word of data.
Figure 10:
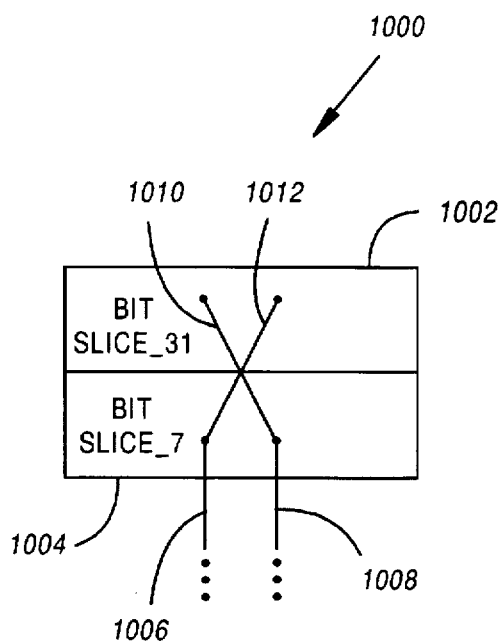
FIG. 10 is a schematic illustrating I/O bus connections in an instruction cache having the ability to receive data words in either a "big" or "little" endien fashion.

As shown in FIG. 9, a word of data may be received in big or little endien form. For example, a 32-bit word may be divided into four quadrants of bits 902–908. When received in big endien form, the bits of the most significant quadrant (i.e., quadrant MSB 902) comprise bits 0–7. When received in little endien form, the bits of the most significant quadrant comprise bits 24–31. A cache 200, 400, 500 will typically be required to receive data in either big or little endien form. As a result, each line of an I/O bus 1006, 1008 (FIG. 10) must connect to corresponding big/little endien bit slices 1002, 1004 via a number of crossover connections 1010, 1012. Such an arrangement 1000 of bus lines 1006, 1008 and crossover connections 1010, 1012 is shown in FIG. 10. With reference to FIG. 9, it can be seen that bit slices 7 and 31 represent a big/little endien pair. To reduce the length of crossover connections 1010, 1012 within a cache 200, 400, 500, the bit slices of big/little endien pairs are arranged in a contiguous fashion.

Alternatively, non-predecode data bit slices 602 could be arranged in ascending order, random order, or grouped by instruction words. However, any of these arrangements will increase the average length of the required crossover connections 1010, 1012.

Figure 11:
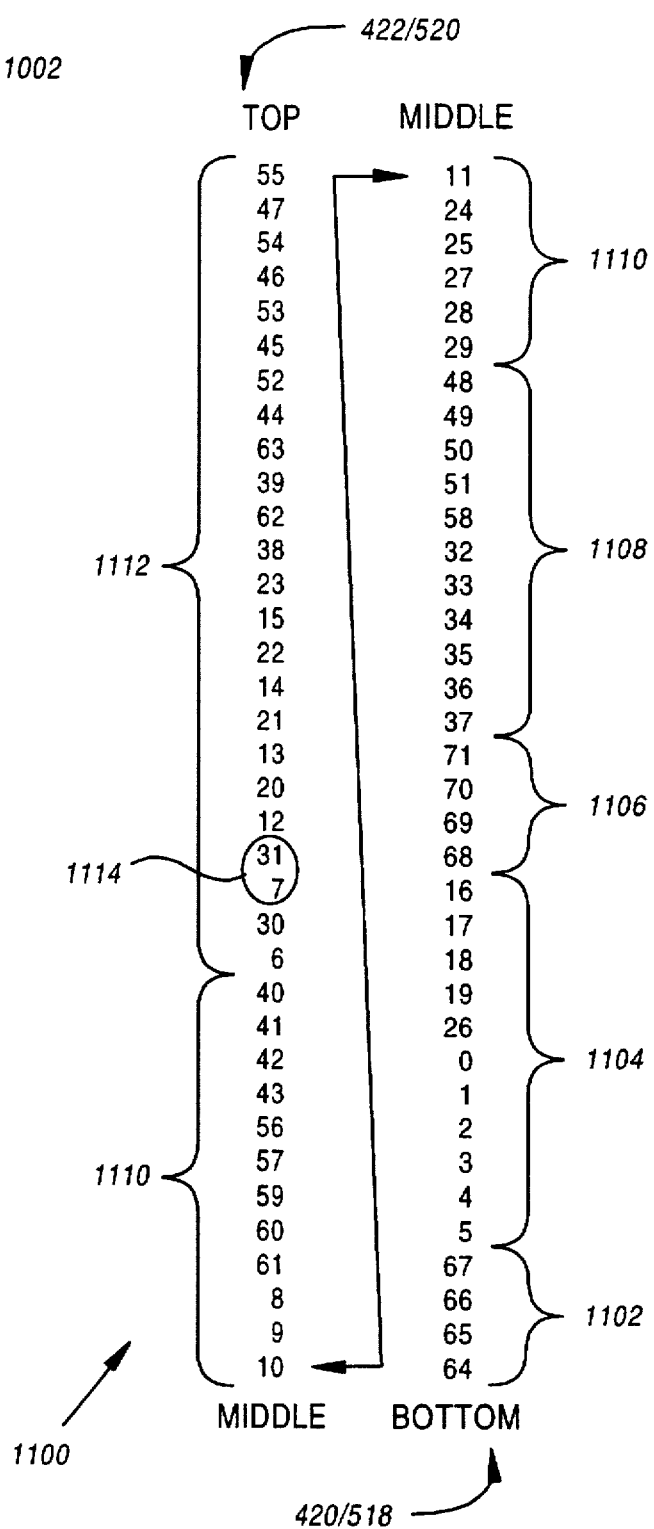
FIG. 11 is a schematic illustrating ordered bit slices in an instruction cache for outputting two 32-bit instructions with corresponding predecode bits.

An exemplary arrangement 1100 of bit slices 1102–1112 in a cache outputting two 32-bit instructions (a doubleword) and eight predecode bits is shown in FIG. 11. The bit slices 1102 for the first instruction's predecode bits are closest to the bottom or I/O end 420, 518 of a cache 400, 500. The predecode data bit slices 1104 corresponding to the first instruction's predecode bits are arranged next closest to the I/O end 420, 518 of the cache 400, 500. Following are the predecode 1106 and predecode data 1108 bit slices for the second instruction. The next eighteen bit slices 1110 comprise those bit slices 1110 which have a predecode data bit as a big/little endien pair. These slices 1110 are arranged (1412, FIG. 14) so as to minimize the length of the big/little endien crossover connections 1010, 1012. For example, bit slice 5 is the data bit slice closest to the cache's I/O end 420, 518. Bit 5 is a big/little endien pair to bit 29 (see FIG. 9). As a result, bit slice 29 is the non-predecode data bit slice placed closest to the cache's I/O end 420, 518. Finally, remaining non-predecode data bit slices 1112 are arranged (1410, FIG. 14) in contiguous big/little endien pairs, as illustrated with bit slices 7 and 31 1114.

Figure 12:
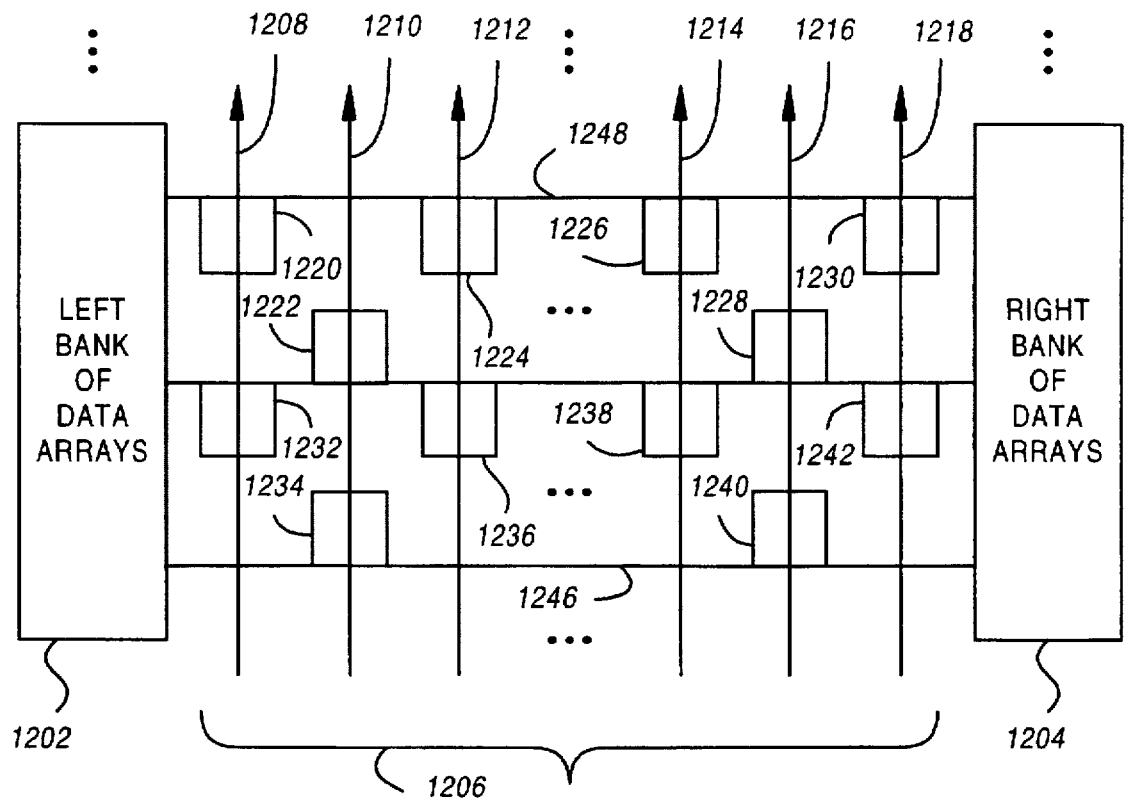
FIG. 12 is a schematic illustrating ordered bit slices with staggered combinational I/O logic components.

In implementing bit slices 362 (or double bit slices 418, or bit half-slices 514, 516), components 1220–1242 (FIG. 12) of combinational I/O logic 368, 408, 508, 510 may be staggered perpendicular to the flow of data on an I/O bus 1206 so that one control line 1208 can control the latching of one logical register 1220, 1232, such as a single doubleword in a prefetch buffer. FIG. 12 shows such an arrangement. Components 1220–1242 of combinational I/O logic 1246, 1248 are arranged in columnar form between a left 1202 and right 1204 bank of data arrays for the easy routing of control lines 1208–1218. It is also important to note that control lines in such a staggered arrangement do not cross components which they do not control. Parasitic capacitances are therefore held to a minimum level. Furthermore, only a minimum number of control lines 1208–1218 need extend into a cache.

A staggered arrangement of combinational I/O logic components 1220–1242 also provides room for adding additional logic components late in the design stage, when space constraints can be extreme.

An alternative to the above would be to pack components and logical registers tightly together. However, a tight packing of latches eliminates the ability to add circuits and fix functional and electrical problems. Tight packing also requires either a custom cell and increases the capacitance on control lines.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A microprocessor instruction cache for storing and outputting a plurality of microprocessor instructions along with their corresponding predecode bits, the cache comprising:

a) an address decoding unit;

b) a plurality of data arrays coupled to said address decoding unit;

c) an I/O bus having terminal and I/O ends; and d) combinational I/O logic connecting each of the plurality of data arrays to the I/O bus;

wherein:

the combinational I/O logic and plurality of data arrays form a plurality of bit slices running substantially perpendicular to the I/O bus, each bit slice corresponds to a single bit to be output from the cache, the bit slices comprise predecode bit slices, predecode data bit slices, and non-predecode data bit slices, and the bit slices nearest the I/O end of the I/O bus comprise substantially all of the predecode bit slices and predecode data bit slices.

2. A microprocessor instruction cache as in claim 1, wherein all of the predecode bit slices and predecode data bit slices are nearest the I/O end of the I/O bus.

3. A microprocessor instruction cache as in claim 1, wherein:

a) the predecode bit slices and predecode data bit slices corresponding to a single microprocessor instruction are substantially contiguous; and b) substantially all of the predecode bit slices corresponding to a given microprocessor instruction are closer to the I/O end of the I/O bus than the predecode data bit slices of the given microprocessor instruction.

4. A microprocessor instruction cache as in claim 3, wherein:

a) all of the predecode bit slices and predecode data bit slices are nearest the I/O end of the I/O bus; and b) all of the predecode bit slices and predecode data bit slices corresponding to a single microprocessor instruction are contiguous.

5. A microprocessor instruction cache as in claim 1, wherein:

a) the plurality of data arrays are divided among a left bank of data arrays and a right bank of data arrays; and b) the I/O bus extends between the left and right banks of data arrays.

6. A microprocessor instruction cache as in claim 5, wherein:

a) each of the bit slices is a double-bit slice comprising two data arrays extending into the left bank of data arrays and two data arrays extending into the right bank of data arrays; and b) the combinational I/O logic of a single double-bit slice comprises inputs which receive a single bit from each of the data arrays in the double-bit slice.

7. A microprocessor instruction cache as in claim 5, wherein:

a) each of the bit slices is a multiple-bit slice comprising an equal number of data arrays extending into the left and right banks of data arrays; and b) the combinational I/O logic of a single multiple-bit slice comprises inputs which receive a single bit from each of the data arrays in the multiple-bit slice.

8. A microprocessor instruction cache as in claim 1, wherein:

a) all of the predecode bit slices are nearest the I/O end of the I/O bus; and b) all of the predecode data bit slices are next nearest the I/O end of the I/O bus.

9. A microprocessor instruction cache as in claim 3, wherein big/little endien pairs of non-predecode data bit slices are contiguous to one another.

10. A microprocessor instruction cache as in claim 9, wherein non-predecode data bit slices having a big/little endien pair in a predecode data bit slice are arranged as close as possible to the predecode data bit slice comprising its big/little endien pair.

11. A microprocessor instruction cache as in claim 1, wherein components of the combinational I/O logic comprising a single bit slice are staggered perpendicularly to the I/O bus such that external control lines connected to components of the combinational I/O logic do not overlap combinational I/O logic components which they do not control.

12. A microprocessor instruction cache for storing and outputting a plurality of microprocessor instructions along with their corresponding predecode bits, the cache comprising:

a) an address decoding unit;

b) a plurality of data arrays coupled to said address decoding unit;

c) an I/O bus having terminal and I/O ends; and d) combinational I/O logic connecting each of the plurality of data arrays to the I/O bus;

wherein:

the combinational I/O logic and plurality of data arrays form a plurality of bit half-slices extending substantially perpendicular to the left and right of the I/O bus, each bit half-slice corresponds to a single bit to be output from the cache, the bit half-slices comprise predecode bit half-slices, predecode data bit half-slices, and non-predecode data bit half-slices, and the bit half-slices nearest the I/O end of the I/O bus comprise substantially all of the predecode bit half-slices and predecode data bit half-slices.

13. A microprocessor instruction cache as in claim 12, wherein:

a) the predecode bit half-slices and predecode data bit half-slices corresponding to a single microprocessor instruction are substantially contiguous; and b) substantially all of the predecode bit half-slices corresponding to a given microprocessor instruction are closer to the I/O end of the I/O bus than the predecode data bit half-slices of the given microprocessor instruction.

14. A microprocessor instruction cache as in claim 12, wherein non-predecode data bit half-slices are arranged as close as possible to their big/little endien pairs.

15. A method of ordering bit slices in a microprocessor instruction cache, wherein the cache comprises an I/O bus, a plurality of data arrays, and combinational I/O logic, wherein the I/O bus has a terminal end and an I/O end, wherein the combinational I/O logic and plurality of data arrays form a plurality of bit slices running substantially perpendicular to the I/O bus, and wherein each bit slice corresponds to a single bit to be output from the cache, the method comprising the steps of:

a) placing substantially all predecode bit slices and predecode data bit slices corresponding to a plurality of microprocessor instructions closest to the I/O end of the I/O bus; and b) placing substantially all non-predecode data bit slices closest to the terminal end of the I/O bus.

16. A method as in claim 15, wherein the step of placing substantially all of the predecode bit slices and predecode data bit slices corresponding to a plurality of microprocessor instructions closest to the I/O end of the I/O bus comprises placing all of the predecode bit slices and predecode data bit slices nearest the I/O end of the I/O bus.

17. A method as in claim 15, wherein the step of placing substantially all of the predecode bit slices and predecode data bit slices corresponding to a plurality of microprocessor instructions closest to the I/O end of the I/O bus comprises:

a) placing the predecode bit slices and predecode data bit slices corresponding to a single microprocessor instruction in a substantially contiguous arrangement; and b) placing substantially all of the predecode bit slices corresponding to a given microprocessor instruction closer to the I/O end of the I/O bus than the predecode data bit slices of the given microprocessor instruction.

18. A method as in claim 17, wherein the step of placing substantially all of the predecode bit slices and predecode data bit slices corresponding to a plurality of microprocessor instructions closest to the I/O end of the I/O bus comprises:

a) placing all of the predecode bit slices and predecode data bit slices nearest the I/O end of the I/O bus; and b) placing all of the predecode bit slices and predecode data bit slices corresponding to a single microprocessor instruction in a contiguous arrangement.

19. A method as in claim 17, further comprising the step of placing big/little endien pairs of non-predecode data bit slices contiguous to one another.

20. A method as in claim 17, further comprising the step of placing non-predecode data bit slices having a big/little endien pair in a predecode data bit slice as close as possible to the predecode data bit slice comprising its big/little endien pair.

* * * * *